(12) United States Patent
    Fliess

(10) Patent No.:   US 12,612,931 B2
(45) Date of Patent:     Apr. 28, 2026

(54) METERING MODULE

(71) Applicant: VERMES MICRODISPENSING GMBH, Holzkirchen (DE)

(72) Inventor: Mario Fliess, Munich (DE)

(73) Assignee: VERMES MICRODISPENSING GMBH, Holzkirchen (DE)

( * ) Notice: Subject to any disclaimer, the term of this patent is extended or adjusted under 35 U.S.C. 154(b) by 172 days.

(21) Appl. No.: 18/553,746

(22) PCT Filed: Apr. 12, 2022

(86) PCT No.: PCT/EP2022/059793
    § 371 (c)(1),
    (2) Date:     Oct. 3, 2023

(87) PCT Pub. No.: WO2022/223377
    PCT Pub. Date: Oct. 27, 2022

(65) Prior Publication Data
    US 2024/0191729 A1     Jun. 13, 2024

(30) Foreign Application Priority Data

Apr. 19, 2021     (DE) ..................... 10 2021 109 850.5

(51) Int. Cl.
    *F15B 13/08*     (2006.01)
    *B29C 64/209*     (2017.01)
    *B33Y 30/00*     (2015.01)

(52) U.S. Cl.
    CPC ........ *F15B 13/0814* (2013.01); *B29C 64/209* (2017.08); *B33Y 30/00* (2014.12); *F15B 13/0871* (2013.01)

(58) Field of Classification Search
    CPC ......... B05C 5/02; B05C 5/027; B05C 5/0275; B05C 5/0279; B05B 1/16; B05B 1/30; G01F 11/00; G01F 11/30
    (Continued)

(56) References Cited

U.S. PATENT DOCUMENTS 4,491,024 A *  1/1985  Miller, Jr. ............... G01F 13/00
                                        73/861.95
5,720,417 A     2/1998  Wurth et al.
               (Continued)

FOREIGN PATENT DOCUMENTS

DE         299 07 968 U1    7/1999
DE    10 2007 055 599 A1   5/2009
               (Continued)

OTHER PUBLICATIONS

International Search Report issued in PCT/EP2022/059793; mailed Sep. 6, 2022.

*Primary Examiner* — Nicholas J. Weiss
(74) *Attorney, Agent, or Firm* — Studebaker Brackett PLLC

(57)           ABSTRACT

The invention relates to a metering module (1, 1″) for metering a metering medium, having a plurality of metering valves (4a, 4b), having a first valve actuator group (2), which has at least two valve actuators (3) arranged alongside one another in a row direction (QR, QR″), which valve actuators (3) each comprise at least one metering head part (4) with an expulsion element (4a), and a second valve actuator group (5) with at least one valve actuator (3), preferably with a plurality of valve actuators (3) that are arranged alongside one another in a row direction (QR, QR″), which at least one valve actuator (3) also comprises a metering head part (4) with an expulsion element (4a). Here, the metering head parts (4) of the first valve actuator group (2) and of the second valve actuator group (5) face one another. Furthermore, the metering module (1, 1″) comprises a metering nozzle arrangement (4′) having a plurality of metering nozzles (4b), wherein each metering head part (4) is assigned a metering nozzle (4b) of the metering nozzle arrangement (4′) such that the metering nozzle (4b), with the (Continued)

Figure 1:
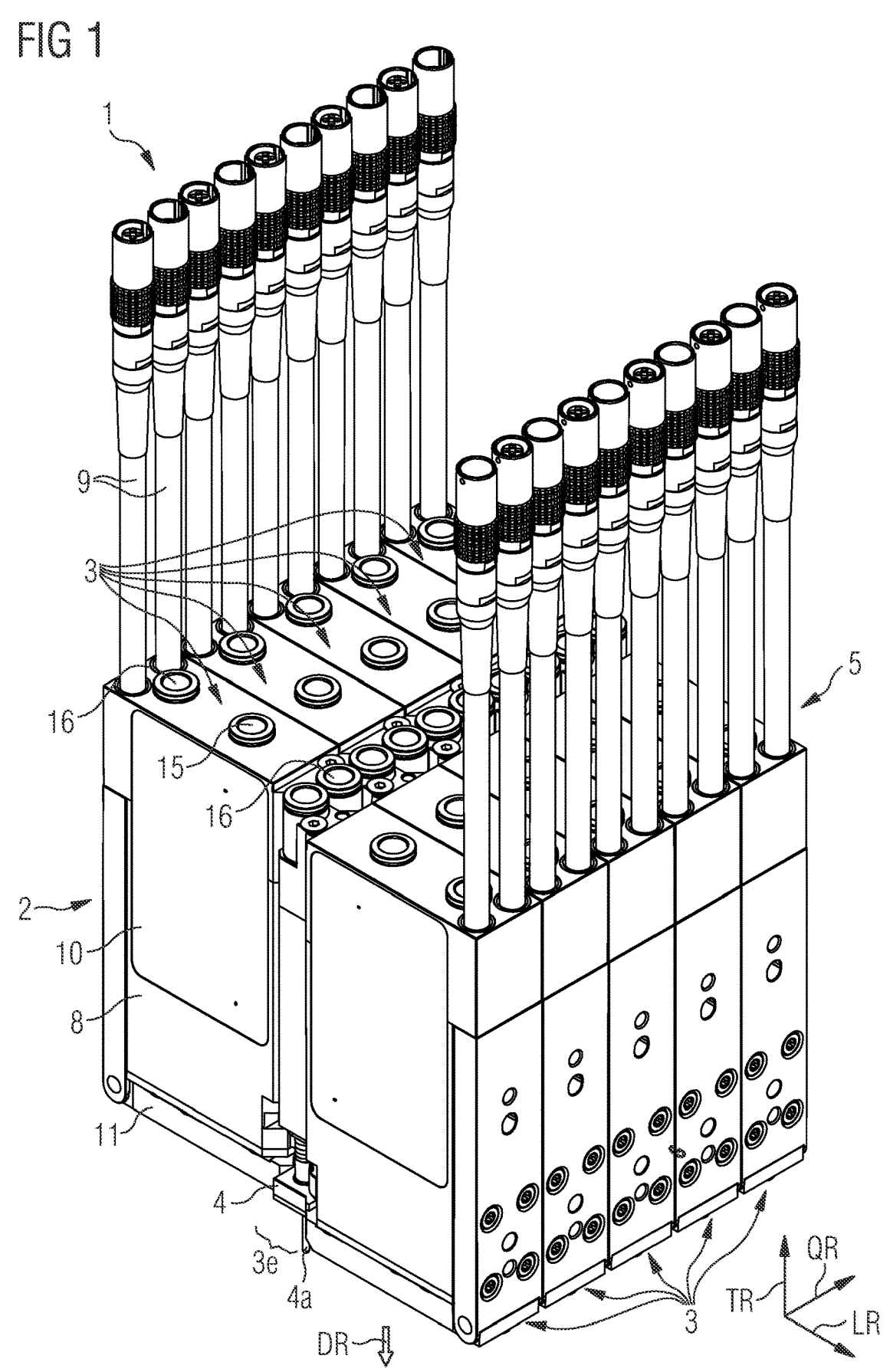

expulsion element (4a) of the metering head part (4), forms in each case a metering valve (4a, 4b).

15 Claims, 4 Drawing Sheets

(58) Field of Classification Search
USPC ........................................................ 222/71
See application file for complete search history.

(56) References Cited

U.S. PATENT DOCUMENTS

| | | | | |
|---|---|---|---|---|
| 5,862,986 | A | * | 1/1999 | Bolyard, Jr. ............ B05B 7/164 |
| | | | | 239/128 |
| 6,419,750 | B1 | | 7/2002 | Tabak et al. |
| 7,967,414 | B2 | | 6/2011 | Schmitt |
| 10,830,259 | B1 | | 11/2020 | Brookins |
| 11,673,149 | B2 | | 6/2023 | Fritz et al. |
| 2004/0118865 | A1 | | 6/2004 | Maruyama et al. |
| 2004/0140161 | A1 | | 7/2004 | Clancy et al. |
| 2009/0128607 | A1 | | 5/2009 | Schmitt |
| 2013/0269605 | A1 | | 10/2013 | Jochheim et al. |
| 2016/0341589 | A1 | * | 11/2016 | Doering .................. G01F 11/30 |
| 2020/0298254 | A1 | | 9/2020 | Fritz et al. |
| 2021/0146397 | A1 | | 5/2021 | Mittag et al. |

FOREIGN PATENT DOCUMENTS

| | | |
|---|---|---|
| DE | 10 2010 014 952 A1 | 10/2011 |
| DE | 20 2013 100 352 U1 | 4/2014 |
| DE | 10 2014 100 392 A1 | 7/2015 |
| DE | 10 2018 108 915 A1 | 10/2019 |
| DE | 10 2021 102 657 A1 | 8/2022 |
| EP | 0 676 247 B1 | 8/1999 |
| JP | 2004-141866 A | 5/2004 |
| JP | 2020-535009 A | 12/2020 |

* cited by examiner

METERING MODULE

The invention relates to a metering module with a plurality of metering valves in the form of a metering valve group arrangement.

Metering valves are usually used to meter a medium which is to be metered, typically a liquid to viscous metering substance, in a targeted manner, for example by a delivery drop by drop or respectively in a metering point-like manner of the metering medium by means of the expulsion element via a metering nozzle of the metering valve. In such a delivery, therefore, in a single metering step (expressed very simply, on an individual expulsion movement of the said expulsion element) for example placing a metering point or respectively "dab" (drop) at a location on a workpiece. Metering valve group arrangements of such metering valves therefore serve for the medium which is to be metered to be able to be delivered simultaneously at several such metering points, for example along a rectilinear metering section or respectively drop section of metering points, in the simplest case in the form of drops or respectively dabs.

A basically different form of the application of material is represented by spraying. In this respect, from DE 10 2010 014 952 A1 for example a spraying device is known for spraying a liquid or suspension onto a surface of a shaping tool. In such spraying devices, in contrast to metering modules of the type mentioned in the introduction, the material is in fact not expelled, but rather it exits under pressure so that, instead of a discrete point application, the material can only be applied over a large area by atomization in a nebulized manner.

From EP 0 676 247 B1 such a metering module is known for example as an application head for the metered delivery of flowing media, which application head only has a small width. Owing to its width, it is possible to arrange a plurality of such application heads alongside one another in a glue application machine by means of a securing device. With such a glue application machine, several metering points can indeed be applied simultaneously along a drop section. On a single metering process with the respective glue application machine, however, a considerable distance exists between the individual metering points or respectively drops, which amounts to at least the width of an application head.

It is therefore an object of the present invention to improve known metering modules.

This problem is solved by a metering module according to claim 1.

As mentioned in the introduction, the metering module comprises a plurality of metering valves. They serve for the metering or respectively metered delivery of a metering medium on a workpiece or respectively substrate, in particular in order to deliver, as described above, a plurality of drops or respectively metering points simultaneously along a metering substance line or respectively metering section.

The metering module further comprises a first valve actuator group, which has at least two valve actuators arranged alongside one another in a row direction, which comprise respectively at least one metering head part with an expulsion element. As the name already implies, the expulsion element concerns an element which, on the expulsion movement, actually expels or respectively conveys material out. Such a valve actuator can, in addition to the metering head part, as usual additionally comprise further, in particular internal, components. In particular, such a valve actuator can be constructed in the interior as a metering system described in DE 10 2021 102 657. An embodiment of such a valve actuator is, however, also explained further in more detail later with the aid of a particularly preferred example embodiment of the metering valve group arrangement.

At least two valve actuators means that the first valve actuator group has a plurality of, i.e. several, valve actuators, which are positioned in a row direction alongside one another or respectively adjacently, therefore one alongside the other or respectively the next.

The metering module furthermore comprises a second valve actuator group with at least one valve actuator, which also has a metering head part with an expulsion element. In the simplest case, the second "valve actuator group" means a group according to mathematical definition, i.e. a so-called "trivial group" with precisely one element, here e.g. precisely one valve actuator.

Preferably, however, the second valve actuator group can have several, therefore at least two valve actuators arranged alongside one another in a row direction, which also respectively comprise at least one metering head part with an expulsion element. Preferably, accordingly the second valve actuator group can be constructed correspondingly like the first valve actuator group.

According to the invention in addition here the metering head parts of the first valve actuator group and the at least one metering head part of the second valve actuator group of the metering module are facing one another. "Facing one another" is to be understood to mean that the two valve actuator groups are arranged relative to one another such that their metering head parts lie with the expulsion element on outline sides directed to one another. In other words, the two valve actuator groups, more precisely their valve actuators, are aligned in a reverse or respectively contrary manner, rotated through 180° with respect to one another.

To complete the metering valves, the metering comprises a metering nozzle arrangement or respectively nozzle group with a plurality of metering nozzles. Here, a metering nozzle of the metering nozzle arrangement is assigned to each metering head part, so that the metering nozzle respectively forms a metering valve with the expulsion element of the metering head part.

The metering nozzles of the metering nozzle arrangement can concern, for example, respectively separate metering nozzles, manufactured for example in one piece, which in the operating state respectively form a detachably coupled metering head of the valve actuator in connection with the expulsion element of the respective metering head part of a valve actuator. In the metering head then respectively an expulsion element is arranged in a so-called valve seat or respectively sealing seat in a metering nozzle.

Likewise, however, the metering nozzle arrangement could also consist or respectively be composed of several groups or respectively metering groups of metering nozzles, which metering nozzles can be securely connected to one another at least within the group and then in turn could be coupled as a group simultaneously detachably to a corresponding group of valve actuators in the number of valve actuators.

Preferably, however, all the metering nozzles of the metering nozzle arrangement can be installed in a related component or respectively form a related component, as is explained more precisely further below.

The metering section which was already mentioned above means here a metering nozzle arrangement with metering nozzles and an arrangement of metering head parts with expulsion elements in series in a row direction of the valve actuators, by which several metering points can be applied simultaneously onto a workpiece along a metering substance line or respectively metering section only minimally offset with respect to one another in a single static metering step without for example, as would be the case with an individual metering nozzle, a metering nozzle having to be dynamically moved or respectively displaced here relative to a workpiece along a line several times for the metering.

By means of the invention, a machine productivity of a superordinate metering machine or respectively metering system, equipped with a metering module in the form of a metering valve group arrangement, can be increased. On the one hand, a metering medium or respectively metering substance can thus be applied more quickly, therefore in a shorter time, onto a target surface of a workpiece. On the other hand, at the same time also more metering medium can be applied, therefore a metering quantity can be increased. Thus, in the same time interval, larger areas can be served, for example in a single metering step a rectilinear path of metering points in the manner of a rectilinear metering line or respectively metering section. In addition, the metering points can also be lined up more closely.

In addition, the construction according to the invention—integrated in a superordinate metering machine or respectively metering system, controllable at least in two spatial directions—makes possible a metering method in the manner of a "3D printing or respectively 3D printing method", in which material is applied layer by layer. For example, the metering medium can be applied repeatedly by means of parallel method of the metering module in a longitudinal direction of the valve actuators (perpendicularly to the row direction over an e.g. horizontal metering area extending in a planar manner, wherein in between times the metering module could be moved in a vertical or respectively depthwise direction, in order to apply a further layer.

Further particularly advantageous embodiments and further developments of the invention will emerge from the dependent claims and from the following description, wherein individual features of various example embodiments or respectively variants can also be combined to form new example embodiments or respectively variants.

Preferably, the first valve actuator group and the second valve actuator group of the metering module can run in a row direction parallel to one another. The valve actuator groups of the metering module, parallel to one another, can therefore for example form a shared (valve actuator-) double row, i.e. a double apposition of valve actuators in two parallel (metering valve or respectively valve actuator) rows.

There are preferred possibilities for the relative arrangement of the valve actuator groups of the metering module (for example in the form of the metering valve group arrangement) with respect to one another.

Preferably, the valve actuator groups can be arranged displaced with respect to one another in row direction.

For example, the valve actuator groups could be arranged with a rectilinear row direction parallel to one another, e.g. displaced or respectively offset in transverse direction or respectively in the direction of the width of the valve actuators. The valve actuators of one valve actuator group can thus be displaced slightly or respectively a little parallel in row direction or respectively extent direction of the valve actuator groups in a linear manner with respect to the valve actuators of the opposite valve actuator group.

Particularly preferably, three opposite valve actuators (two from one and one from the other valve actuator group) can face one another in an offset manner, and can stand or respectively adjoin directly to one another here at least in some places, such as e.g. at the metering head parts.

Such an arrangement of the valve actuators of a valve actuator group, displaced or respectively offset to one another, with respect to the other valve actuator group in a metering module in the form of the metering valve group arrangement makes possible for example (with corresponding control in operation), after application of a group or respectively row of discrete (metering substance) drops or respectively metering points inter alia by means of the expulsion elements of the first valve actuator group on a workpiece in a very simple manner the application of a second group or respectively row of further metering points respectively between the previously applied metering points. For this, it is sufficient to move the two valve actuator groups, after the delivery of the first group or respectively row of metering points or respectively drops in a row connection direction (transversely, preferably perpendicularly, to the row direction of the groups) of the two valve actuator groups, by the distance between the valve actuator groups relative to the workpiece, in order to then apply the second group or respectively row of metering points onto the workpiece. In this way, the metering points can be applied at half-distance with respect to one another along a discrete line of metering points extending in row direction. A discrete line of metering points means a line in which the metering points are at least somewhat spaced apart from one another.

With additionally sufficiently large discrete metering points, in addition with the said arrangement and with such a procedure, a continuous or respectively constant metering section, therefore a metering substance line could be applied on a workpiece extremely quickly and with a simple linear movement of travel, in which the individual metering points adjoin one another or respectively at least partially overlap one another.

Moreover, this arrangement (with corresponding control in operation)—by the metering module being directed with continuous delivery of metering substance in row connection direction over a workpiece—also permits the forming of a metering substance area extending in a planar, i.e. two-dimensional, manner, by the previously already described metering substance line being widened in the row connection direction to a metering substance area with the width of the metering substance line and with any desired length.

Preferably, the metering head parts of the two valve actuator groups can be arranged in an interlocked manner into one another. For this, the arrangement of the valve actuators can be selected in a suitable manner. "Interlocked" means that the valve actuators engage in row direction at least partially between one another. Further preferred embodiments of the interlocking are additionally explained further below.

Various possibilities also exist for the alignment of the valve actuators to one another or respectively with one another.

Preferably, the valve actuators of a respective valve actuator group can be aligned to one another substantially parallel alongside one another. "Aligned to one another parallel alongside one another" means an alignment or respectively orientation of the same kind of the valve actuators, in which each valve actuator of a valve actuator group is oriented or respectively aligned identically or respectively uniformly to all other valve actuators of the same valve actuator group.

Alternatively, the valve actuators of a respective valve actuator group can preferably be aligned with an angular offset to one another. This has the advantage that the valve actuators of the respective group can be aligned to few or to only one shared metering point, in order to thus for example increase the metering quantity at few or at one metering point.

Basically, the alignment of the valve actuators to one another is independent here of the course of the row direction.

Preferably, the valve actuators of one of the valve actuator groups, e.g. when they are aligned with an angular offset to one another, can be arranged in a fan-like manner alongside one another in a curved row direction or respectively on an arc which is curved in a convex manner, so that for example they can all be aligned to a metering point.

Particularly preferably here the valve actuators at least of one valve actuator group can be directed to a shared metering point. It is thus achieved that the valve actuators can be arranged at the same distance with respect to the target surface. In other words, the valve actuators are thus arranged and aligned in some sections in an inclined manner to one another on a type of "cylinder surface".

Most particularly preferably, the valve actuators of both valve actuator groups can be directed to a shared metering point. This means that the valve actuators are arranged in some sections on a type of "spherical surface" and aligned to one another or respectively to the sphere centre in an inclined manner, as will be further explained later with the aid of an example embodiment.

Preferably, the valve actuators of one of the valve actuator groups can be arranged in a rectilinear manner alongside one another in a straight or respectively straight-lined row direction.

Preferably, both valve actuator groups can be configured in a rectilinear manner or both in a fan-like manner. However, for example they can also be different, e.g. one valve actuator group as a straight line and the other as a curved fan.

Preferably, a valve actuator can be in contact in row direction with at least one further adjacent valve actuator, in particular with an end section of a valve actuator (as will be additionally explained further below), or respectively can lie housing to housing.

In the simplest construction (with the least outline requirements) therefore respectively two adjacent valve actuators of a valve actuator group, arranged alongside one another, can be in contact with one another or respectively abut one another for example along an outline side, i.e. outline side to outline side and, as it were, form a "valve actuator pair". Basically they could be constructed here almost in any desired manner on the remaining outline sides, e.g. have connections etc. With such a "valve actuator pair", which is to be arranged at least as a pair in a compact, extremely close manner, a relative close double row of metering points can be formed very simply along a metering section, in which the metering points can then be metered closely alongside one another at least always in pairs in one step. For the double application quantity, a second valve actuator pair of the second valve actuator group could be arranged according to the invention. Here, the valve actuators can be e.g. engaged, glued, clicked or else screwed to one another.

The preceding statements concerning the valve actuator pairs are not, however, to be regarded as being restrictive. Thus, for example, the valve actuators can also be closely contacted in larger groups.

For example, in the case of two straight valve actuator groups or two valve actuator groups which are curved in the same manner, the valve actuators can be in contact with at least one further valve actuator.

Likewise, the valve actuator groups of the double row can be arranged e.g. on shorter outline sides which face one another (explanation later) of the respective valve actuator, preferably almost directly, therefore e.g. only spaced apart by a gap width, at a relatively small distance from one another relative to the length of the valve actuators.

Particularly preferably, the valve actuators or respectively the metering head parts of the two valve actuator groups can even be arranged deeply interlocked into one another such that the metering head parts form with the expulsion elements a shared rectilinear metering section of metering points which are spaced apart from one another, as is additionally explained later with the aid of a particularly preferred example embodiment. For this, the two valve actuator groups are pushed into one another in a sawtooth-like manner in row connection direction. Further advantages of an arrangement, interlocked in such a manner, of the two valve actuator groups with respect to one another are further explained in addition further below.

In other words, all the valve actuators—except for the two outermost valve actuators at the beginning and end of the two groups—can be arranged or respectively interlocked so that (at least in the region of the metering head parts or respectively in the bay section of the valve actuators) they engage with their expulsion element respectively centrally between two opposite expulsion elements of two valve actuators of the other valve actuator group. Thus respectively a further metering point can be applied between two metering points of a valve actuator group without interim travel movement of the superordinate metering system, so that the distances between the metering points are halved—compared to the distances between the expulsion elements in the case of only one valve actuator group with valve actuators oriented in only one direction. Therefore an extremely small, here e.g. half, distance is created between the metering points, which in any case is smaller than a hitherto possible distance with the known constructions of the prior art.

This is because there a minimally possible distance between individual metering points is always limited to the thickness or respectively width of the respective individual valve, i.e. a closer arrangement is not possible.

At this point, it is to be mentioned that with a curved row direction, the valve actuators or respectively the metering head parts of the two valve actuator groups can for example likewise be interlocked deeply into one another in such a manner. However, the metering head parts with the expulsion elements then form a metering section of metering points, spaced apart from one another, running on an arc.

In addition, the metering module, however, is not restricted to an interlocking, recessed in such a manner, of the expulsion elements into one another. In many cases, however, a smaller, only slight interlocking would achieve a corresponding effect as an almost straight application line or respectively metering section of the metering substance (without such a travel movement in row connection direction, as was already described further above). This depends on the settings and the metering substance or respectively metering substance quantities, namely how large the area of the metering points becomes on the workpiece.

Thus e.g. already in the case of a smaller interlocking, at least a slightly wave-shaped metering section of the metering points would be able to be achieved, in which the wave shape would be visible according to the metering point size if applicable only on enlarged viewing. Precisely in applications in which basically a hundred percent rectilinear metering substance line is not concerned, accordingly also wider valve actuators or respectively metering head parts could also already be used, which are not able to be arranged so deeply interlocked into one another with the same metering point distance. The metering points of such wider valve actuators, however, are still able to be arranged distinctly closer to one another than is the case with only a group of valve actuators which are arranged alongside one another in a shared orientation.

Preferably, the valve actuator groups or respectively the individual valve actuators of the valve actuator groups respectively can be arranged preferably as exactly as possible within the usual tolerances with respect to one another in a displaced or respectively offset manner by half a width of a valve actuator.

Such an arrangement enables the application of a group or respectively row of discrete metering points at a half distance from one another (in relation to a distance of two valve actuators of a valve actuator group arranged alongside one another).

Alternatively or additionally, the valve actuator groups can be arranged displaced respectively by a width of an end section of a valve actuator, explained in the following, in for example rectilinear row direction with respect to one another.

There are also preferred possibilities for the arrangement of the valve actuators of a valve actuator group. Basically, each of the above valve actuators could be configured to be square in outline in top view.

Preferably, however, a valve actuator can have a substantially rectangular, in particular rather elongated, perimeter or respectively outline, i.e. with two shorter and two longer outline sides, in order to be able to arrange or respectively group, in particular line up the valve actuators with their metering head parts with the expulsion element extremely closely at as small a distance as possible alongside one another. "Substantially rectangular" is to be understood such that the valve actuator, except for an end section, can be formed in a rectangular manner on one of the shorter outline sides—which end section the metering head part forms with the expulsion element. In other words, a valve actuator can therefore be narrower in the region of the expulsion element in a transverse direction or respectively row direction (in which the further valve actuators of the valve actuator group also adjoin one another proceeding laterally via the respective valve actuator) than in the remaining part in longitudinal direction (perpendicular to the transverse direction or respectively in the direction away from the other parallel valve actuator group) behind the expulsion element.

Preferably, the shorter outline size, therefore the wide side or respectively transverse side can have or respectively amount to, as a maximum, two thirds, particularly preferably as a maximum one half, of a length of the longer outline side, therefore of the longitudinal side.

Preferably, the metering head parts with the expulsion element of the valve actuators can respectively protrude in a bay-like manner on the respective valve actuator, by for example the end section, already mentioned above, projecting on one of the shorter outline sides in a bay-shaped manner from the remaining outline of the valve actuator, i.e. forming, as it were, a bay section containing the expulsion element, which thus forms only a part of the outline side. The expulsion elements can be positioned here centrally along the shorter outline side in the bay section of the valve actuator.

Preferably, a valve actuator can have at most a maximum width (shorter outline side or respectively wide side) of 30 mm. The maximum width is the width at the thickest location of the valve actuator. Particularly preferably, a valve actuator can have at most a maximum width of 20 mm and most particularly preferably at most a maximum width of 10 mm.

Preferably, a valve actuator at the nozzle head part with the expulsion element or respectively with an entire housing side of the expulsion element can have a half width or respectively half of the previously mentioned maximum width, therefore for example can also be formed off-centre only on a first or second half of the width.

Such valve actuators of a first valve actuator group can thus equally be arranged laterally alongside one another and additionally with a second valve actuator group of identically constructed, or respectively congruent at least as regards outline, valve actuators facing opposite one another with metering head parts arranged in a mirrored manner with in each case an expulsion element, so that in transverse direction (or respectively row direction) along the double row of the metering module, for example in the form of the metering valve group arrangement, with respectively metering valves offset with respect to one another in an alternating manner in two directions, an expulsion element of a valve actuator of the first valve actuator group alternates with an expulsion element of a valve actuator of the second valve actuator group. In total, such valve actuators with particularly narrow metering head parts can be arranged in a very compact manner with a halved nozzle distance with respect to one another. A metering substance can thus be placed at closer distances alongside one another than the actual width of the respective outline side of the valve actuator would permit this due to space.

Preferably, the expulsion elements can be arranged interlocked into one another here in a row connection direction of the two valve actuator groups perpendicularly to the direction of the width or respectively transverse direction of the valve actuators, advantageously also lying very closely adjacent.

As already mentioned above, the metering nozzles of the metering nozzle arrangement can be installed on or respectively in a related component. Preferably, the metering nozzle arrangement of the metering module can have a nozzle unit with a plurality of metering nozzles with are integrated or are able to be inserted into the nozzle unit in a detachable manner.

Here, in addition to the metering nozzle arrangement, the nozzle unit can also comprise further parts or respectively functional areas, such as e.g. a nozzle media supply or parts thereof (for example a suitable channel structure to the metering nozzles etc.), as is further explained later.

A particularly preferred nozzle unit could be configured for example in the form of a nozzle plate with a region with predefined nozzle positions for the metering nozzles or metering nozzles already formed in the nozzle unit, without limiting the nozzle unit to a plate-like, substantially two-dimensional form. Preferably, the nozzle unit can be able to be coupled here with the at least two valve actuator groups, in particular with each individual valve actuator, in order to couple or respectively connect all the valve actuators mechanically to one another like a clasp or bridge. Particularly preferably the nozzle unit can be coupled here with detachable fastening means, such as e.g. screws, to the valve actuators.

Preferably, the nozzle unit can be configured in the form of a nozzle plate which is curved in an arc-shaped manner, particularly preferably in the form of a cylinder-segment-shaped nozzle plate. This presents itself e.g. in the case of valve actuators which are arranged in a fan-like manner.

With a nozzle unit, such as e.g. a nozzle plate, for fastening the individual valve actuator groups or respectively the valve actuators of the valve actuator groups (e.g. also simply via plug-in connection for an even quicker coupling and uncoupling), the metering module, preferably in the form of a complete metering valve group arrangement, could be offered as a finished component with a plurality of plug-in positions for a variable number of valve actuators. The customer himself could exchange individual valve actuators for maintenance or cleaning purposes simply and quickly with minimum expenditure of time. If required, a place could also be reserved for the mounting of a specific control unit for the metering module on the nozzle unit, or the control unit could already be placed thereon, in order to be able to activate the valve actuators of the metering module, for example on mounting on a superordinate metering system or a robot for the spatial control, via a connection by means of the control unit jointly or individually for metering. The nozzle unit can then also serve for the joint fastening of the metering module on the metering system or on the robot.

Preferably, the metering module can be configured additionally with a shared metering media supply for at least a portion of the metering nozzles of the metering nozzle arrangement, preferably on or respectively in the nozzle unit. The individual metering media supply connections of the individual metering nozzles of the metering nozzle arrangement for the continuous supply with metering substance from a metering substance reservoir or respectively tank, such as e.g. a cartridge, can be connected or respectively coupled via a suitable channel structure in series or else respectively individually to such a metering media supply.

According to an alternative embodiment of the invention, the metering nozzle arrangement can comprise a plurality of separate metering nozzles, which respectively individually are able to be coupled to the at least two valve actuator groups, in particular to the individual valve actuators separately. The separate metering nozzles can also be particularly preferably able to be coupled detachably to the at least two valve actuator groups, in particular to the individual valve actuators separately.

Figure 2:
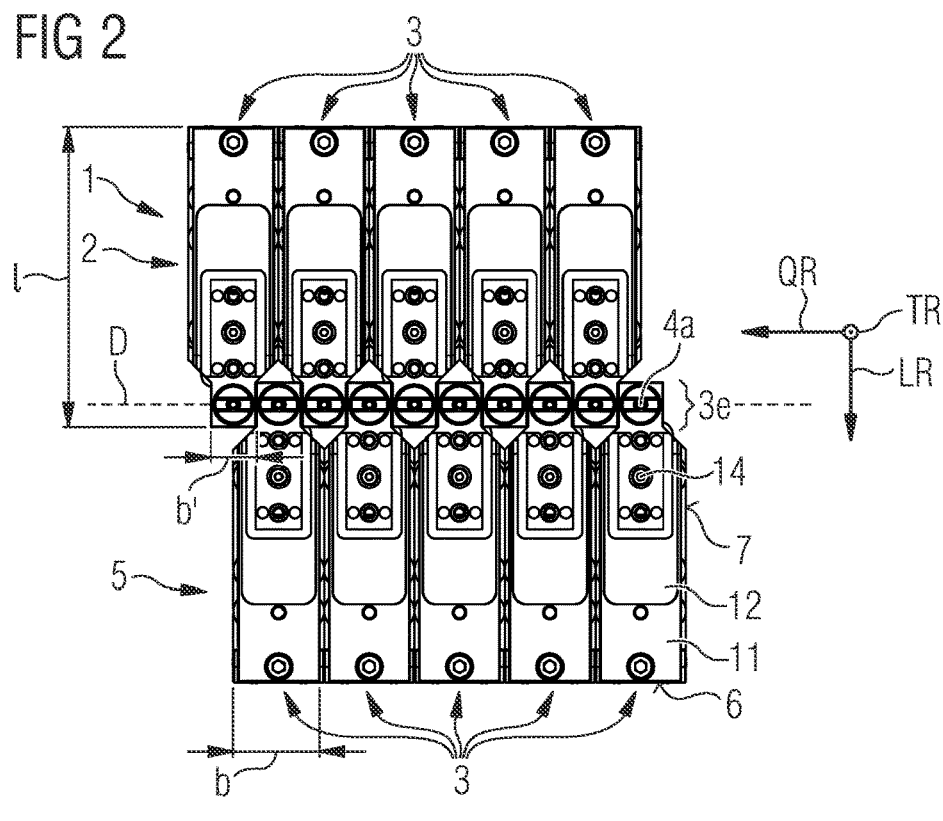

The invention is explained more closely once again in the following with reference to the enclosed figures with the aid of example embodiments. Here, in the various figures, the same components are provided with identical reference numbers. The figures are generally not to scale and are to be understood merely as a schematic representation. There are shown:

FIG. 1 a perspective view of an example embodiment of a metering module according to the invention in the form of a metering valve group arrangement, with nozzle unit removed, FIG. 2 a bottom view onto the example embodiment of FIG. 1, FIG. 3 a side view onto the example embodiment of FIG. 1, FIG. 4 a perspective bottom view from obliquely below onto the example embodiment of FIG. 1, but now with coupled-on nozzle unit, FIG. 5 a longitudinal section through the nozzle unit according to FIG. 4, without reservoir and compressed air supply hose, with two coupled valve actuators (represented in part), FIG. 6 a longitudinal section through a further example embodiment of a metering module according to the invention in the form of a fan-like metering valve group arrangement, with correspondingly adapted, coupled nozzle unit.

FIG. 1 shows a perspective view of an example embodiment of a metering module 1 according to the invention in the form of a metering valve group arrangement 1 (here with uncoupled nozzle unit 20). In the following, the metering valve group arrangement 1 is designated without loss of generality as metering valve row arrangement 1, as in the example embodiments the valve actuator groups 2, 5 respectively comprise at least two valve actuators 3, which are respectively arranged or respectively lined up in a double row.

The metering valve row arrangement 1 according to the first example embodiment has on the one hand five valve actuators 3 arranged alongside one another in a transverse direction QR, forming a first valve actuator row 2. In a longitudinal direction LR opposite, offset thereto in transverse direction QR, on the other hand five further valve actuators 3 are arranged, forming a second valve actuator row 2. The metering valve row arrangement 1 of the present example embodiment consequently forms, for example as shown in the present example embodiment, a double row 2, 5 of ten valve actuators 3 which are identical to one another. The valve actuators 3 of both valve actuator rows 2, 5 are arranged here respectively with respect to one another or respectively with their respective metering head part 4 interlocked into one another, wherein the metering head parts 4 have respectively an expulsion element 4a for the metering of a metering medium on a workpiece. The interlocking is so that the expulsion elements 4a jointly form a rectilinear metering section D, as is to be seen in FIG. 2 with the aid of a view from below onto the metering valve row arrangement 1. The said expulsion elements 4a are configured here in the form of elongated tappets 4a with a tappet tip at the front end on the workpiece side and with a tappet head at the rear end on the lever side, as is additionally explained further below.

As the concern is with a plurality of identical valve actuators 3, in the following in a representative manner with the aid of an individual valve actuator 3 its (illustrated) outer construction is described more extensively, and its non-illustrated inner construction is subsequently described somewhat less extensively.

Relative directional information such as "above", "below", "on the upper side", "on the underside", "lateral", "on the short side", "on the longitudinal side", "front", "rear" etc. refer here, as also in the entire document, arbitrarily to the representation in figures, although the metering valve row arrangement 1 in operation is used predominantly in the orientation illustrated in FIG. 1, i.e. mostly a metering onto a workpiece takes place substantially with gravity, therefore in metering direction DR or respectively contrary to a depth direction TR downwards.

Each valve actuator 3 has substantially a cuboid-shaped housing 8, which extends in three orthogonal spatial directions, namely in the transverse direction QR, the longitudinal direction LR and the depth direction TR. The cuboid-shaped housing 8 itself, illustrated in a bottom view in FIG. 2, is substantially rectangular in outline, i.e. configured with two shorter outline sides 6 (in transverse direction QR) and two longer outline sides 7 (in longitudinal direction LR) with a length l.

On the upper side (upwards in depth direction TR) at least in the connected state of a valve actuator 3, for operation a plurality of lines or respectively connections exit from the cuboid-shaped housing 8. In addition to two lines or respectively cables 9 for the exchange of data with a control unit (not illustrated here), for supply with the power required in operation (e.g. for the integrated heating) and for the actuating and monitoring of the piezoelectric drives, three further connections are situated on an upper side of the housing 8, namely a plug-in connection of a feed channel 15 and two plug-in connections of two discharge channels 16 for a cooling medium for cooling the valve actuator 3. The cooling medium can be e.g. a gas, such as air, but also a cooling liquid. By means of the individual central introduction and the double discharging, on both sides, of the cooling medium on the two outer sides of two actuators (explanation below) remote from one another in longitudinal direction, a back pressure of the cooling medium can be minimized and hence a cooling capacity or respectively cooling effectivity of the cooling can be maximized.

As the arrangement of the valve actuators 3 according to the invention concerns a metering valve row arrangement 1 in particular, however, a width b of the housings 8 of the valve actuators 3, the width b of the valve actuators 3, therefore a transverse extent in the transverse direction QR as a whole is already configured in as narrow a manner as possible.

Figure 3:
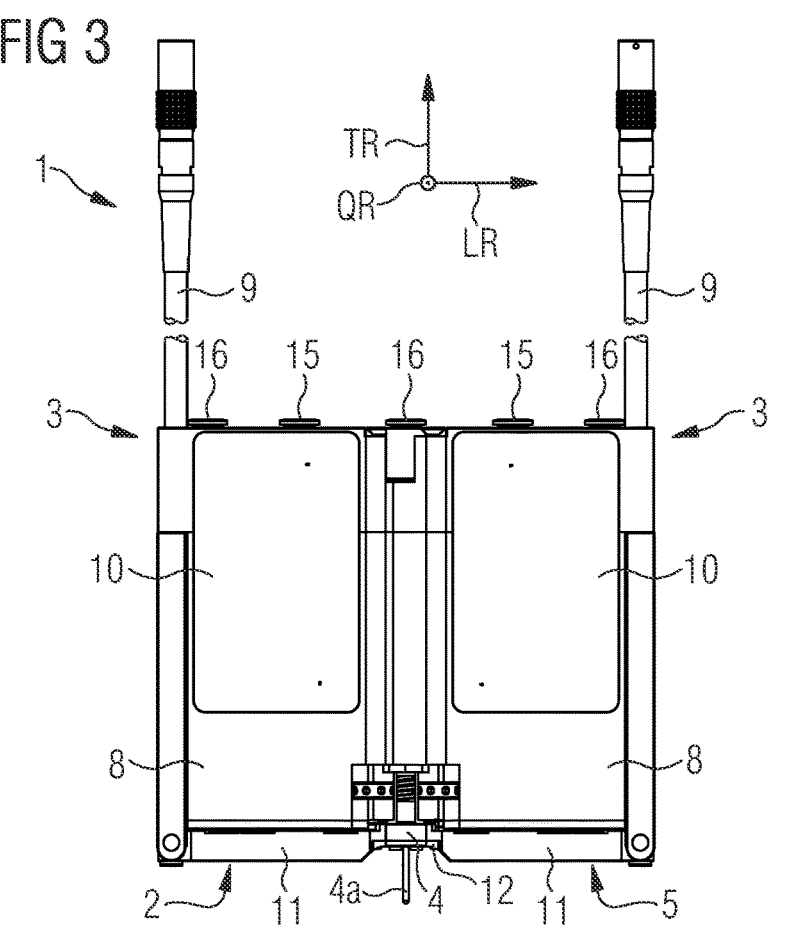

A particularity in the sense of an additional local narrowing in transverse direction QR is presented by the already mentioned metering head part 4 or respectively the entire housing side of the valve actuator 3, pointing to the respectively other valve actuator row 2, 5, on the side of the metering head part 4 (therefore e.g. in FIG. 3: the left-hand housing side of the right-hand valve actuator 3).

The metering head part 4 or respectively the entire housing side in the region of the metering head part 4 (therefore in particular also the part in depth direction TR above the actual metering head part 4) therefore protrudes on the respective shorter outline side 6 only centrally in the manner of a "bay-like extension" or respectively bay section 3e, so that the housing side as a whole is narrowed. Here, the housing 8 on the housing side of the metering head part 4 is continuous from the upper side to the underside, i.e. is configured narrower in the bay section 3e or respectively end section 3e on the end side in transverse direction QR than the remaining housing 8. It has there only the half width b' of the metering head part 4, preferably approximately half of the width b of the remaining valve actuator 3.

With this, therefore as it were, narrowed or respectively "tapered" housing side in transverse direction QR, the valve actuator 3 adjoins at least one opposite valve actuator 3 of the other valve actuator row 2, 5. More precisely, it can thus be arranged such that it projects with the narrowed bay section 3e between two likewise "tapered" housing sides, therefore between two likewise narrowed bay sections 3e of two opposite valve actuators 3 of the other valve actuator row 2, 5.

The metering head parts 4 of the valve actuators 3 are thus positioned substantially edge to edge in an interlocking manner alongside one another. Therefore, in this arrangement according to the invention, respectively a valve actuator 3 of a valve actuator row 2, 5 stands with its metering head part 4 flush laterally on a metering head part 4 of a valve actuator 3 of the other valve actuator row 2, 5. With this structural configuration and arrangement, a distance is once again reduced between the individual metering head parts 4 and hence the distance between the individual metering points. In particular with the use of the same metering substance in all metering nozzles, this small distance can be utilised to produce a tight-knit, quasi continuous drop section of metering points. Depending on the size of the drops, such drops then have no longer any to almost no longer any distance with respect to one another and thus form, if applicable, as already mentioned, a continuous metering substance line of a metering substance.

On the remaining housing side on the other side of the narrowing, i.e. in the wider part, the valve actuator 3, as stated, is configured to be consistently wide or respectively thick, as is to be seen in particular in FIG. 1. Furthermore, a cover plate 10 is additionally situated externally on the housing 8. It covers or respectively protects inter alia a processor board or respectively control board, centrally arranged in longitudinal direction LR, for controlling the valve actuator 3 in the interior of the valve actuator 3. Additionally, inter alia also an insulating board for insulation with respect to the actuators (as explained below), a connecting board, a Hall sensor board and a voltage supply for the valve actuator 3 can also be integrated in the housing 8.

In order to hold the tappet 4a of a valve actuator 3 and to guide it in a suitable manner for an expulsion movement (in the direction of the nozzle opening), the nozzle head part 4 also includes a tappet centring screw for the guided receiving of the tappet 4a, which is held or respectively received by the metering head part 4 in an annularly surrounded manner. In order to mount the tappet 4a resiliently in the valve actuator 3, a tappet spring is situated between a tappet head of the tappet 4a and the tappet centring screw. By means of a fluidics positioning 11 on the underside of the valve actuator 3, the tappet 4a, mounted in the tappet centring screw, is held here in a tensioned manner against a lever (situated here thereabove in the housing 8) of the valve actuator 3.

In the interior, the metering valve row arrangement 1 can be constructed in particular like the metering system of DE 10 2021 657 in the interior. Here, within the housing 8 of the valve actuator 3, a lever, mounted in a tiltable manner in a lever support, stands directly on the tappet head, which lever in turn is acted upon about its tilting axis alternately (directly to the right and left or respectively before and after the tilting axis) with a tilting moment, which is triggered by two piezo actuators or respectively actuators, placed obliquely with respect to one another, standing at two actuator engagement sites on the lever. The entire movement mechanics (i.e. the lever support via the lever against the two actuators) is braced or respectively prestressed here by means of a spring element, here for example configured as a plate spring assembly, against or respectively in the housing. Therefore, reference is to be made to DE 10 2021 102 657 for the detailed construction, the content of which is incorporated here in this respect.

For a metering operation in a metering system (not illustrated here), the valve actuator group, formed from the rows 2, 5 of valve actuators 3 with respectively their metering head parts 4, for the formation of a metering valve row arrangement 1 is coupled with a nozzle unit 20, more precisely with the metering nozzles 4b of the metering nozzle arrangement 4', e.g. in a region on the nozzle unit 20.

Figures 4, 5:
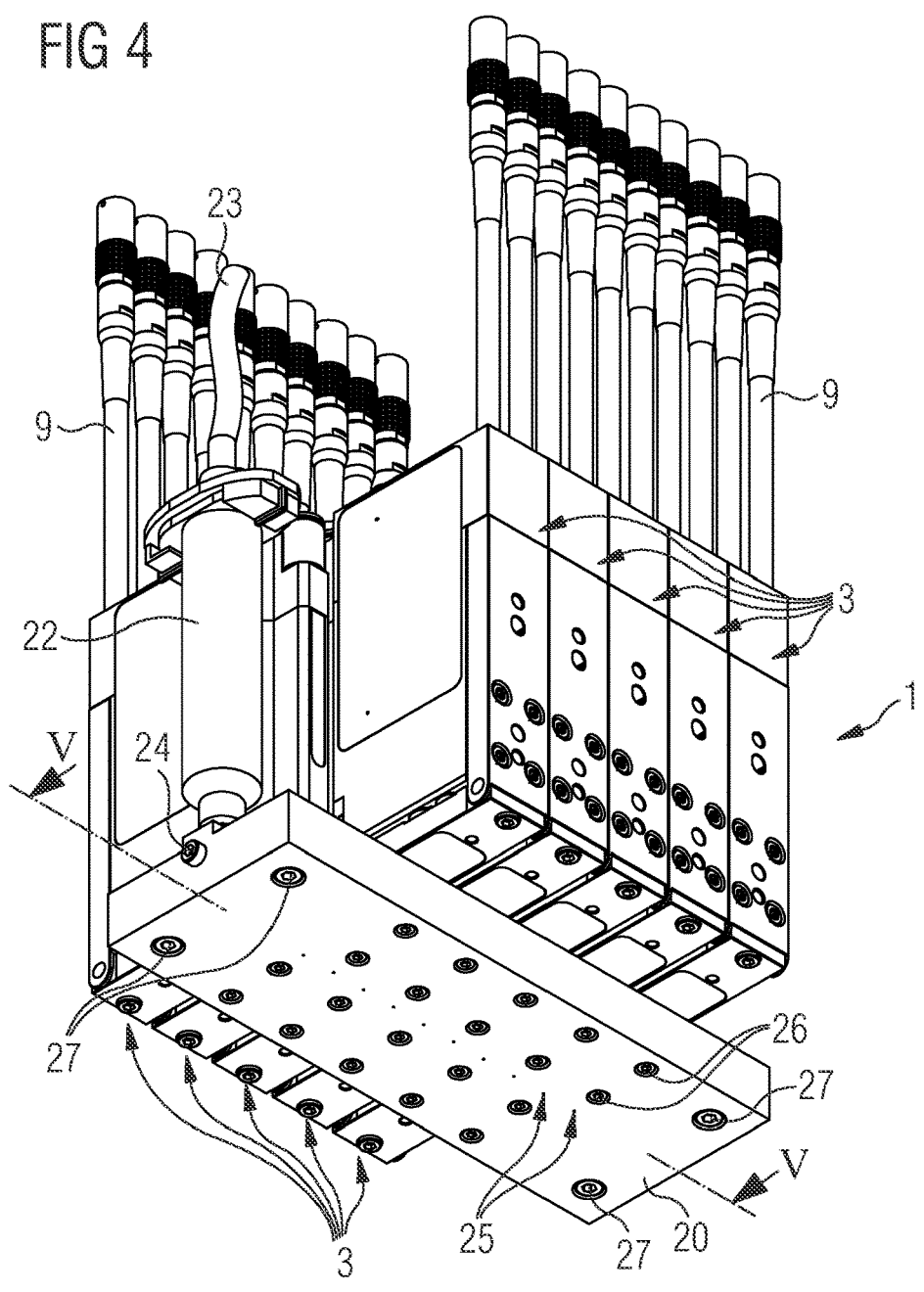

FIG. 4 shows a nozzle unit 20 configured as nozzle plate 20 in a perspective bottom view.

The nozzle plate 20 is shown in FIG. 5 once again without reservoir and compressed air supply hose (which, if required, can also comprise a heating connection cable) in a longitudinal section through the nozzle plate 20 along the section line V-V to illustrate the inner workings. Here in FIG. 5 (on the right here) by way of example—in order to make the structure of the nozzle plate 20 better visible— only two valve actuators 3 of the valve actuator rows 2, 5 are shown at least in part in the coupled state with the nozzle plate 20. Hereby, it becomes apparent what the coupled state of the valve actuators 3 with the metering nozzles looks like approximately in the interior, how therefore an expulsion element 4*a* is positioned or respectively sits in the so-called sealing seat or respectively valve seat in a nozzle chamber 4*b*' of a metering nozzle 4*b*. In the construction in FIG. 4 in fact all the metering nozzles 4*b* are respectively coupled with a metering head part 4 or respectively with a valve actuator 3 of the valve actuator rows 2, 5.

Here, the metering valve row arrangement 1 is arranged or respectively positioned with the tappets 4*a* of the valve actuators 3 on the nozzle plate 20 of the metering nozzle arrangement 4' in a metering position. Thereby, the tappets 4*a* of the valve actuators 3 extend into respectively a metering nozzle 4*b* or respectively into respectively a seal of a metering nozzle 4*b* on the nozzle plate 20 with the formation of the valve seat or respectively sealing seat. For sealing between the valve actuators 3 and the metering nozzles 4*b*, more precisely between the tappets 4*a* and the nozzle chambers 4*b*', namely in an upper part of the metering nozzles 4*b*, corresponding seals, such as e.g. ring seals or respectively membrane seals (not illustrated here) are situated, which in the coupled state of the valve actuators 3 with the nozzle plate 20 (as illustrated in FIG. 4) then sit in a ring-shaped manner between the nozzle chambers 4*b*' and the tappets 4*a*.

As can be seen with the aid of FIG. 4, the valve actuators 3 of the metering module 1 are respectively detachably screwed to the nozzle plate 20 by screws 26, which are screwed into the valve actuators 3 through the nozzle plate 20. The nozzle plate 20 itself could, in turn, be fastened for example by means of the screws 27 on a robot arm of the superordinate metering system, in order to fasten the metering module 1 with the nozzle plate 20 integrally on the metering system for the metering operation.

The nozzle plate 20 further comprises an integrated nozzle media supply 21 or respectively channel structure 21 from a reservoir 22 or respectively tank 22 to the metering nozzles 4*b* for the sufficient and constant feeding or respectively guiding of a metering medium for the valve actuators 1 from the shared reservoir 22. The channel structure 21 leads here from the reservoir 22 via a vertical channel into the interior of the nozzle plate 20, from where a horizontal channel leads to the metering nozzles 4*b*. As the metering nozzles 4*b*, corresponding to the valve actuators 3 of the valve actuator rows 2, 5 are interlocked deeply into one another such that all the metering nozzles 4*b* lie on a straight line, the channel structure 21 manages with a single channel which runs horizontally through the nozzle plate 20 and connects all the metering nozzles 4*b* or respectively nozzle chambers 4*b*' of the metering nozzles 4*b* to one another and supplies them with metering medium.

However, the channel structure is not limited to the example embodiments which are shown. Basically, a nozzle plate can have any desired number of channels. For example, a specific channel could run to each nozzle chamber of each metering nozzle. Alternatively or additionally, for example, also further channels, exiting perpendicularly to the row direction from one or more channels, running parallel to the row direction, could branch off to the individual nozzle chambers or to a group of nozzle chambers.

Furthermore, the nozzle chambers of the metering nozzles of the respective rows could be supplied for example in groups by means of corresponding supply channels or respectively could be connected to at least one reservoir.

Alternatively or additionally, the metering nozzles of the metering valves, e.g. can be supplied e.g. individually, in groups or in rows, preferably with different media or respectively metering media (e.g. from a corresponding number of reservoirs).

The metering media supply 21 comprises on the way between reservoir 22 and the metering nozzles 4*b*, more precisely at a branching to the nozzle chambers 4*b*' of the metering nozzles 4*b* of the nozzle unit 20, an opening which is closed by a closure element 24 at least during the normal metering operation. The opening can be opened when a cleaning of the channel of the metering media supply 21 is to be carried out. Moreover, this opening assists in the introduction of the metering media supply 21 or respectively channel structure 21 into the nozzle unit 20, in particular when the channel structure 21, which consists here e.g. of a vertically and a horizontally running channel to the metering nozzles, is bored.

Alternatively or additionally, a nozzle plate, in particular when it has a more complex channel structure, e.g. has one of the variants described above, can be produced or respectively printed for example an a 3D printing method.

As shown furthermore in FIG. 4, the nozzle plate 20 comprises additionally here a reservoir 22, which is able to be acted upon with pressure via a pressure supply. As metering processes are generally very temperature-sensitive, a temperature control of the nozzle plate 20 via a heating or cooling or nozzle plate 20 suggests itself. This can take place centrally, i.e. for the entire nozzle plate 20, or individually over the attack surfaces of the respective valve actuators 3. An additional temperature control of the reservoir 22 and of any supply line or piping between reservoir 22 and nozzle plate 20 is furthermore optionally conceivable, but is not explicitly presented in the example embodiments.

On the underside of the valve actuator 2, described above, in addition a heating element 12 with temperature sensor is arranged at the fluidics positioning 11, which, in the coupled state with the metering nozzle arrangement 4' of the nozzle unit 20, heats the nozzle chamber 4*b*' of the metering nozzle 4*b* on the nozzle unit 20, in particular when the tappet 4*a* is moved, in operation, through the nozzle chamber 4*b*' into an open or closed position into the nozzle opening 25 of the metering nozzle 4*b*. The heating element 12 here is screwed onto the fluidics positioning 11 by means of at least one screw 14.

Figure 6:
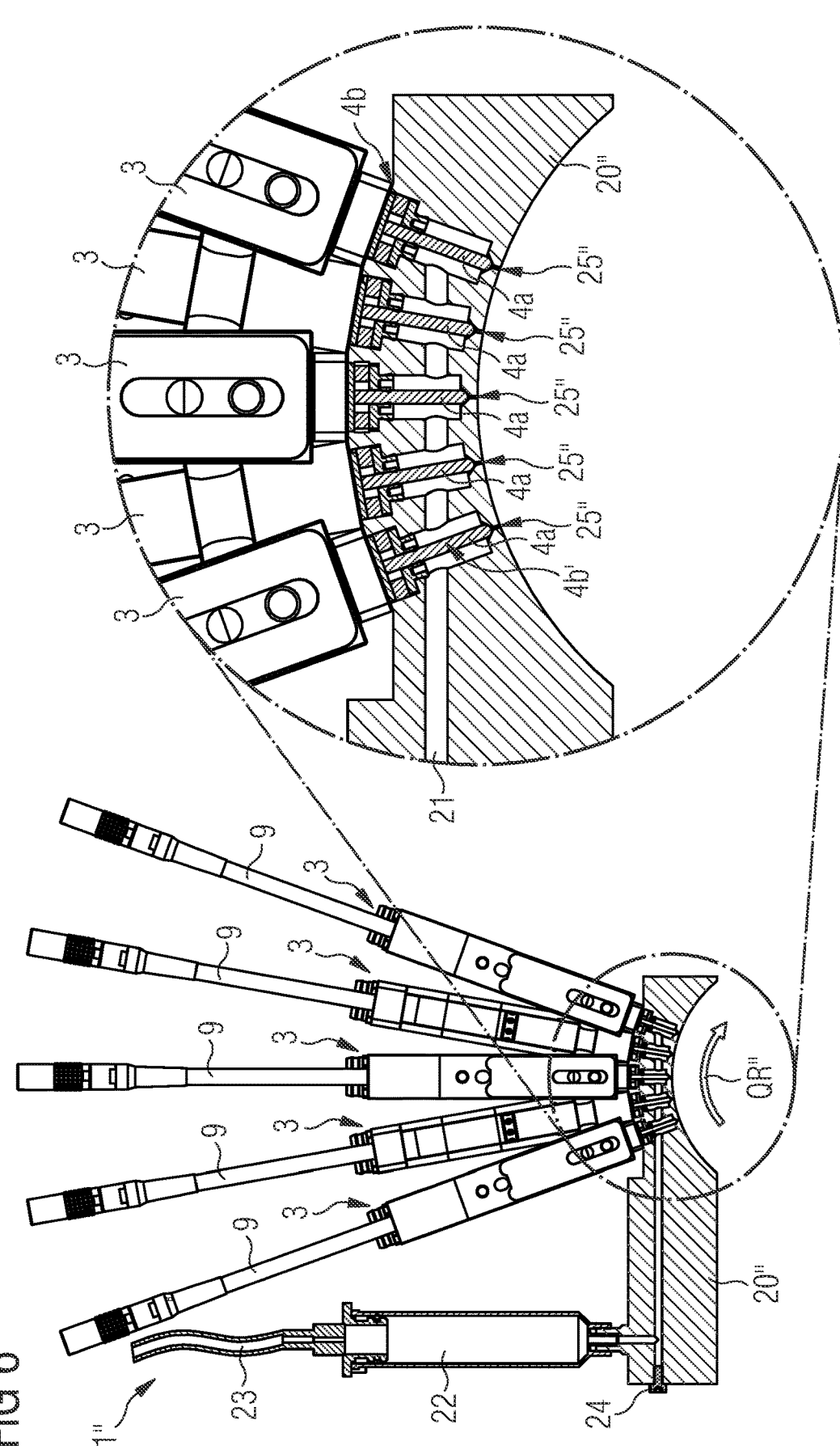

FIG. 6 shows a further example embodiment of a metering module 1" according to the invention, in the form of a fan-like or respectively curved metering valve row arrangement 1" with a nozzle unit 20" in the form of a nozzle plate 20" in longitudinal section. The example embodiment which is shown here can be formed in a substantially identical manner to the preceding example embodiment, except for the differences specified below.

In contrast to the preceding example embodiment, the nozzle plate 20" is formed in a curved manner at least in the region of the metering nozzles 4*b*, therefore the valve actuators 3 are not arranged in the same two-dimensional plate parallel to one another perpendicularly to the row direction QR (as was the case in the previous example embodiment), but rather are directed or respectively inclined in a fan-like manner with metering directions inclined to one another along a curved row direction QR" onto a shared metering point overlapping in longitudinal section.

In practice, for this, on the one hand the upper side of the nozzle plate 20", on which the valve actuators 3, as also in the previous example embodiment are coupled to the metering nozzles 4*b*, is configured to be curved slightly upwards in the region of the metering nozzles 4*b*. On the other hand, the underside of the nozzle plate 20" is also recessed in a curved shape upwards in the region of the metering openings 25" of the metering nozzles 4b, so that the nozzle plate 20" in longitudinal section between upper side and underside has the shape of a circular ring sector with a uniform thickness. In the interior of the circular ring sector of the nozzle plate 20", the metering nozzles 4b are aligned radially between upper side and underside of the nozzle plate 20" towards the imaginary centre point of the circular ring sector. At this point it is to be mentioned that the two rows of the metering nozzles 4b for the valve actuators 3 of the valve actuator rows 2, 5, as also in the previous example embodiment, are again interlocked into one another so deeply that all the metering nozzles 4b lie on a line and are thus connected to one another with an individual horizontal channel of the channel structure 21 or respectively metering media supply 21.

The, here by way of example five, valve actuators 3 of the two valve actuator rows 2, 5 are therefore coupled with a slight angular offset to one another—with the metering head parts 4 resting almost flush on the surface of the nozzle plate 20" and with the expulsion elements 4a projecting into the metering nozzles 4b—to the metering nozzles 4b formed radially to the surface in the nozzle plate 20". Here, the three valve actuators 3 of the first valve actuator row 2 (in longitudinal section in the foreground) and the remaining two valve actuators 3 of the second valve actuator row 5 (in longitudinal section in the background in the two intermediate spaces of the three valve actuators 3) are interlocked into one another such that all five valve actuators 3, viewed from above (not illustrated), would lie on a metering line.

With a suitably selected distance to the workpiece surface, with this arrangement with angularly offset metering valves, an individual metering point (in the intersection of the metering jets) can be achieved.

Alternatively or additionally, over a variable distance to the target surface, also several metering points, lying as close or respectively near to one another as desired, could be placed or respectively metered on a workpiece.

With the metering module 1" according to the second example embodiment, basically also a mixture could be the aim, i.e. for example a metering medium consisting of several components is used, wherein the components then with a corresponding channel structure could advantageously intermix only during the metering on the workpiece.

The metering system in operation can control or respectively move the metering module 1, 1" in the form of the metering nozzle row arrangement 1 accordingly into a desired metering position relative to a workpiece, in which the metering medium can then be expelled by means of a corresponding metering movement of the tappets 4a in a targeted manner out from the metering nozzles 4b or respectively the nozzle chambers 4b' of the metering nozzles 4b—very finely metered depending on the opening cross-section or respectively diameter of the nozzle opening 25.

For the expulsion of metering material or respectively metering substance, a movement mechanism within the valve actuator 3 then generates and transfers a corresponding expulsion- and retraction movement to the tappet head of the tappet 4a for the deflection of the tappet 4a in the metering direction DR already mentioned above.

The construction described above has the advantage that with the valve actuators 3 of the metering valve row arrangement 1, 1", in operation a desired metering medium can be applied or respectively delivered in portions from one or more nozzle chambers 4b' of one or more metering nozzles 4b in succession, simultaneously or alternating onto a workpiece in small or large quantities. For this, the metering valve row arrangement 1, 1" can be controlled accordingly. On each metering or respectively each metering process, at least one drop, able to be metered exactly with regard to quantity, of a desired metering medium is delivered in a metering direction DR through an opening cross-section or respectively the already mentioned nozzle opening 25 of a selected metering nozzle 4b, controlled by means of a rapid movement or respectively tappet movement of the tappet 4a indirectly via the lever, and driven by the actuators working in a mirror-inverted manner. For this, the nozzle opening 25 can also be configured in the form of a changeable nozzle insert on the metering nozzle 4b, in order to be able to set a metering quantity and metering form easily and quickly, specifically for different fields of application.

Finally, it is pointed out once again that the device previously described here in detail merely concerns an example embodiment which can be modified by the specialist in the art in a variety of ways, without departing from the scope of the invention. For example, several metering valve group arrangements, in particular e.g. a metering valve row arrangement according to the first example embodiment and a further metering valve row arrangement according to the second example embodiment, could also be arranged in a metering system and/or distinctly more valve actuators could be arranged in a metering valve row arrangement. Furthermore, the use of the indefinite article "a" or respectively "an" does not rule out that the features concerned can also be present in a multiple manner.

LIST OF REFERENCE NUMBERS

1, 1" metering module/metering valve group arrangement/metering valve row arrangement
2 first valve actuator row
3 valve actuator
3e end section, bay-like/bay section
4 metering head part
4a expulsion element/tappet
4' metering nozzle arrangement
4b metering nozzle
5 second valve actuator row
6 shorter outline sides
7 longer outline sides
8 housing
9 cable
10 cover plate
11 fluidics positioning
12 heating element
14 screw
15 feed channel for a cooling medium
16 discharge channels for a cooling medium
20, 20" nozzle unit/nozzle plate
21 metering media supply/channel structure
22 reservoir/tank
23 compressed air supply hose
24 closure element
25, 25" nozzle openings
26 screws for fastening the valve actuators on the nozzle unit
27 screws for mounting the metering module on a super-ordinate metering system
A-A section line
b width of a valve actuator
b' width/diameter of the metering head part of the valve actuator
l length of a valve actuator
D rectilinear metering section DR metering direction
LR longitudinal direction
QR transverse direction/row direction, rectilinear
QR" row direction, curved
TR depth direction
The invention claimed is:

1. A metering module (1, 1") for metering a metering medium, having a plurality of metering valves (4a, 4b), having a first valve actuator group (2), which has at least two valve actuators (3) arranged alongside one another in a row direction (QR, QR"), wherein the valve actuators (3) each comprise at least one metering head part (4) with an expulsion element (4a), and a second valve actuator group (5) with at least one valve actuator (3), that are arranged alongside one another in a direction (QR, QR"), wherein the at least one valve actuator (3) also comprises a metering head part (4) with an expulsion element (4a), wherein the metering head parts (4) of the first valve actuator group (2) and of the second valve actuator group (5) face one another, and with a metering nozzle arrangement (4') having a plurality of metering nozzles (4b), wherein each metering head part (4) is assigned a metering nozzle (4b) of the metering nozzle arrangement (4') such that the metering nozzle (4b), with the expulsion element (4a) of the metering head part (4), forms in each case a metering valve (4a, 4b), wherein the first valve actuator group (2) and the second valve actuator group (5) run parallel to one another in a direction (QR, QR") that the metering head parts are aligned, and are directly adjoining one another.

2. The metering module according to claim 1, wherein the valve actuator groups (2, 5) are arranged displaced with respect to one another in row direction (QR, QR").

3. The metering module according to claim 2, wherein metering head parts (4) of the two valve actuator groups (2, 5) are arranged interlocked into one another.

4. The metering module according to claim 1, wherein the valve actuators (3) of a respective valve actuator group (2, 5) are aligned substantially parallel alongside one another or with an angular offset with respect to one another.

5. The metering module according to claim 1, wherein the valve actuators (3) of one of the valve actuator groups (2, 5) are arranged in a rectilinear manner alongside one another in a straight row direction (QR)

or wherein the valve actuators (3) of one of the valve actuator groups (2, 5) are arranged in a fan-like manner alongside one another in a curved row direction (QR"), wherein the valve actuators (3) at least of one valve actuator row (2, 5), are directed to a shared metering point.

6. The metering module according to claim 1, wherein a valve actuator (3) is in contact with at least one further valve actuator (3) adjacent in row direction (QR, QR").

7. The metering module according to claim 1, wherein the valve actuator groups (2, 5) are arranged displaced with respect to one another respectively by a half width (b) of a valve actuator (3) and/or by a width (b') of an end section (3e) of a valve actuator (3) in row direction (QR).

8. The metering module according to claim 1, wherein a valve actuator (3) has a substantially rectangular outline (6, 7), with a longer outline side (7) and a shorter outline side (6).

9. The metering module according to claim 8, wherein the shorter outline side (6) has at most two thirds of a length of the longer outline side (7).

10. The metering module according to claim 1, wherein the metering head parts (4) of the valve actuator (3) project from a perimeter of the valve actuator when viewed in a plan view of the metering head parts.

11. The metering module according to claim 1, wherein a valve actuator (3) has a maximum width (b) of 30 mm, and wherein a valve actuator (3) on the metering head part (4) has a half width (b') of the maximum width (b).

12. The metering module according to claim 3, wherein the metering head parts (4) of the two valve actuator groups (2, 5) are arranged interlocked into one another such that the metering head parts (4) of the valve actuators (3) of the two valve actuator groups (2, 5) form a shared rectilinear metering section (D).

13. The metering module according to claim 1, wherein the metering nozzle arrangement (4') has a nozzle unit (20, 20") with a plurality of metering nozzles (4b) which are integrated or are able to be detachably inserted into the nozzle unit (20, 20"), wherein the nozzle unit (20, 20") is able to be coupled to the at least two valve actuator groups (2, 5).

14. The metering module according to claim 1, wherein the metering nozzle arrangement (4') comprises a plurality of separate metering nozzles (4b), which respectively are able to be coupled to the at least two valve actuator groups (2, 5).

15. The metering module according to claim 13, with a shared metering media supply (21) for at least a portion of the metering nozzles (4b) of the metering nozzle arrangement (4').

\* \* \* \* \*